(12) United States Patent
Rahul et al.

(10) Patent No.: US 8,640,199 B2
(45) Date of Patent: Jan. 28, 2014

(54) NETWORK SERVICE PROVISION METHOD, NETWORK DEVICE, NETWORK SERVER AND NETWORK

(75) Inventors: Rahul, New Delhi (IN); Badrinarayan Ravichandran, Andhra Pradesh (IN)

(73) Assignee: Hewlett-Packard Developmet Company, Houston, TX (US)

( * ) Notice: Subject to any disclaimer, the term of this patent is extended or adjusted under 35 U.S.C. 154(b) by 1147 days.

(21) Appl. No.: 12/333,337

(22) Filed: Dec. 12, 2008

(65) Prior Publication Data

US 2010/0107221 A1   Apr. 29, 2010

(30) Foreign Application Priority Data

Oct. 23, 2008   (IN) .............................. 2596/CHE/2008

(51) Int. Cl.
*H04L 29/06* (2006.01)
(52) U.S. Cl.
USPC ............................................................ 726/3

(58) Field of Classification Search
USPC ............................................................ 726/3
See application file for complete search history.

(56) References Cited

U.S. PATENT DOCUMENTS

| | | | | |
|---|---|---|---|---|
| 2008/0285757 | A1* | 11/2008 | Bradley et al. | 380/278 |
| 2008/0305813 | A1* | 12/2008 | Rao | 455/466 |
| 2010/0058445 | A1* | 3/2010 | Zhu | 726/4 |

* cited by examiner

*Primary Examiner* — Michael S McNally

(57) ABSTRACT

A method of providing a service to a network device from a group of network devices, some but not all of the network devices being subscribed to the service, the method includes determining which network devices of the group are not subscribed to the service in response to a service request from one of the network devices of the group; querying at least the network devices of the group that are subscribed to the service for permission to at least temporarily share the service with an unsubscribed network device; and at least temporarily providing the service to at least some of the unsubscribed network devices in response to a positive response to the query from at least one of the subscribed network devices. A network, network device and network server that can implement various aspects of this method are also disclosed.

18 Claims, 3 Drawing Sheets

NETWORK SERVICE PROVISION METHOD, NETWORK DEVICE, NETWORK SERVER AND NETWORK

RELATED APPLICATIONS

Benefit is claimed under 35 U.S.C. 119(a)-(d) to Foreign application Serial No. 2596/CHE/2008 entitled "NETWORK SERVICE PROVISION METHOD, NETWORK DEVICE, NETWORK SERVER AND NETWORK" by Hewlett-Packard Development Company, L.P., filed on 23 Oct. 2008, which is herein incorporated in its entirety by reference for all purposes.

FIELD OF THE INVENTION

The present invention relates to a method of providing a service to a network device from a group of network devices, some but not all of the network devices being subscribed to said service.

The present invention further relates to a network device, network server and network implementing various aspects of the above method.

BACKGROUND OF THE INVENTION

The evolution of multimedia networks such as an IP multimedia subsystem (IMS) network has resulted in the quick and efficient creation and deployment of services over the network to the network devices of the users of the network.

Within the context of such networks, there is a trend towards the definition of communities or groups, with network-based services being established between different members of the group or even between all members of the group, e.g. social networking, video conferencing, group-shared video streaming, multiplayer gaming, internet protocol television (IPTV), voice over internet protocol (VoIP) and audio conferencing.

However, a problem associated with such shared services is that it requires that all network devices, i.e. all users of these devices, have access to such services. This is not always the case, because the subscription of a service by a network device in a group is not necessarily linked to the services subscribed by other network devices present in the group. In other words, it is likely that different members of the group have access to different levels of network services, which for instance may be the result of different users subscribing to different service packages, e.g. gold, silver, platinum packages, which typically unlocks different services for the network device subscribed to different packages. This can hamper or even prohibit the sharing of services between different network devices in such a group.

BRIEF DESCRIPTION OF THE EMBODIMENTS

Figure 1:
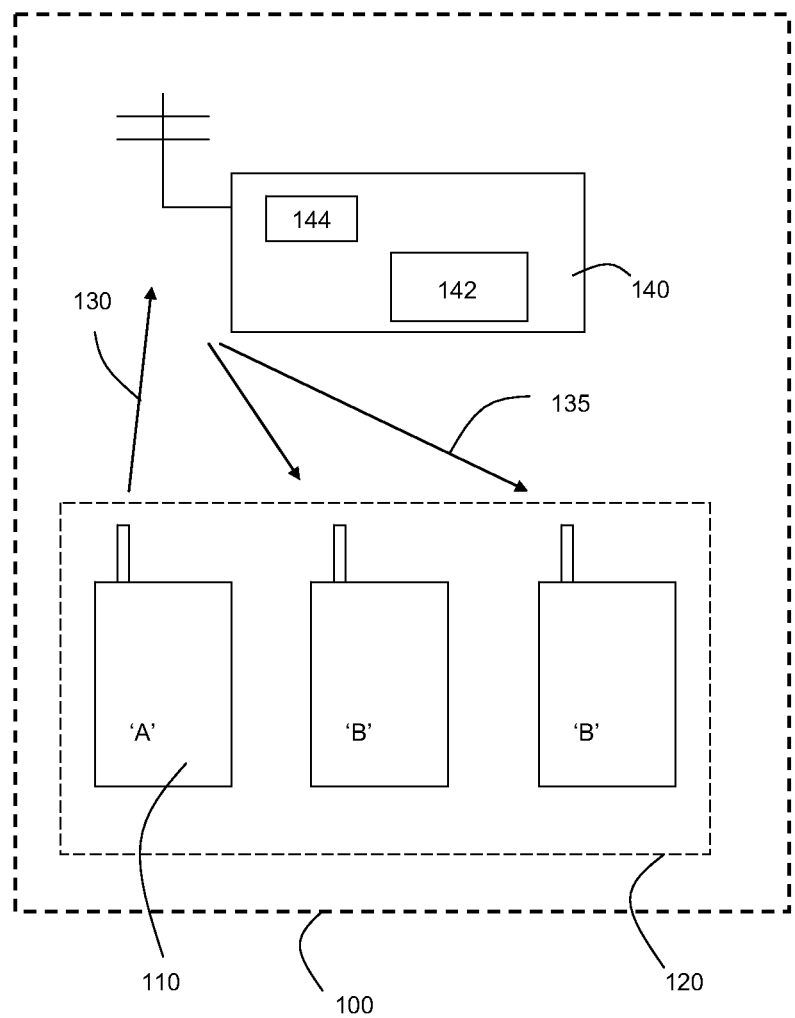
Figure 2:
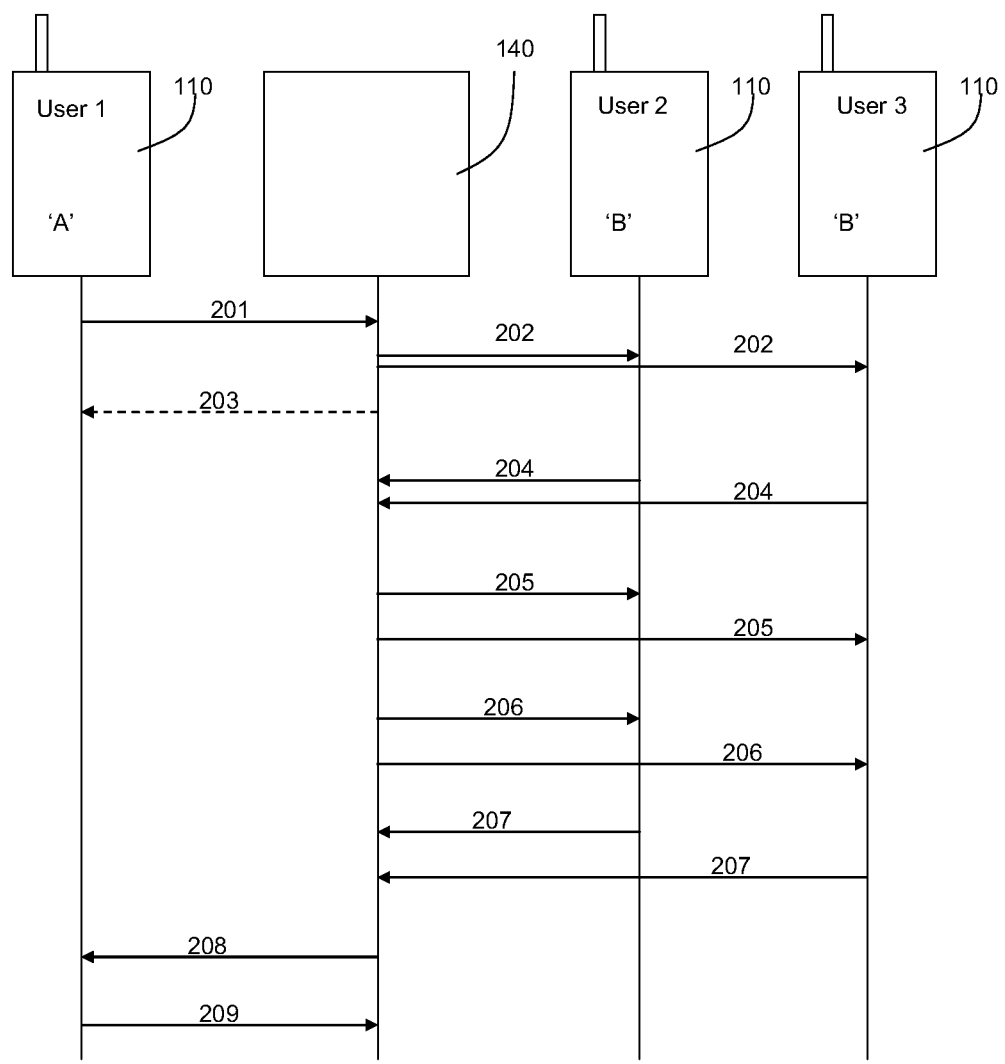
Figure 3:
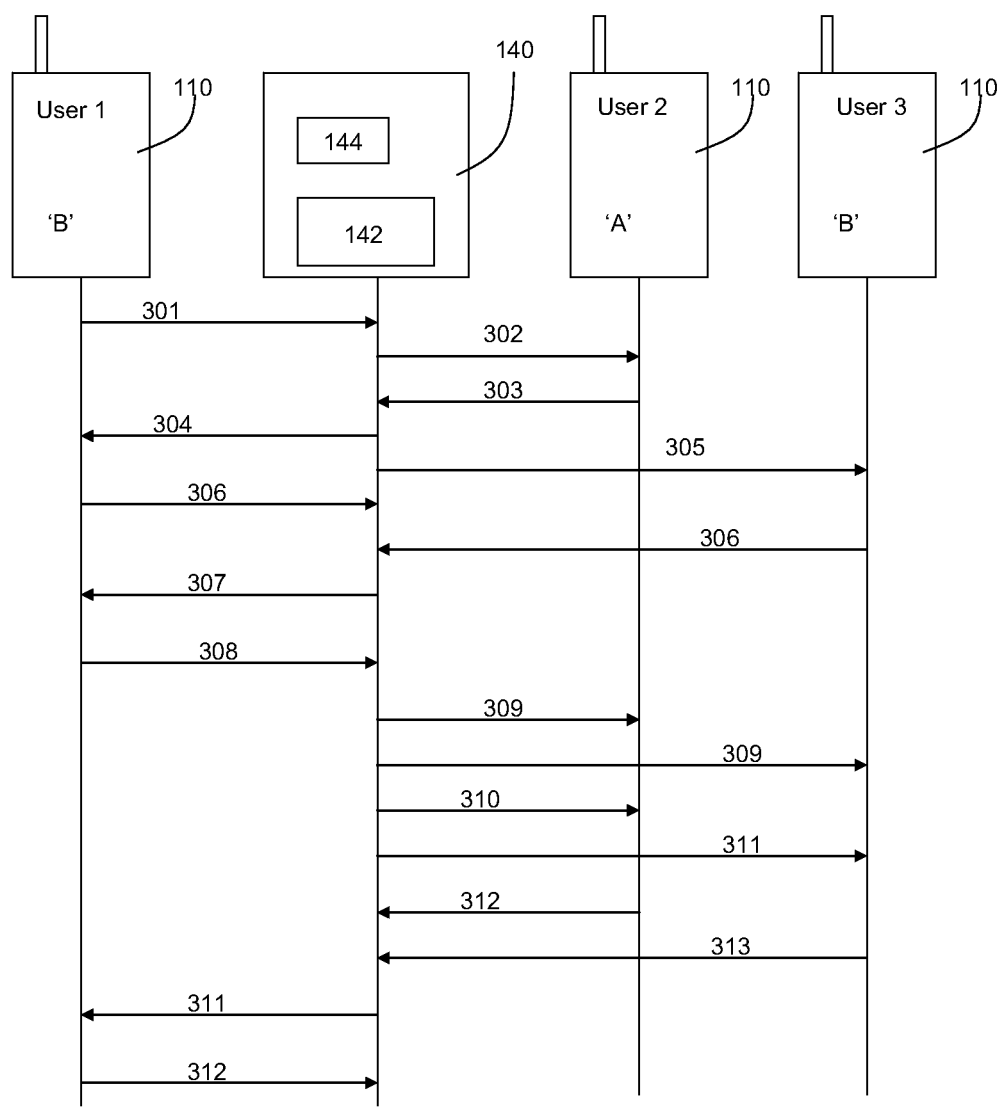

Embodiments of the invention are described in more detail and by way of non-limiting examples with reference to the accompanying drawings, wherein:

FIG. 1 schematically depicts an embodiment of a network in accordance with the present invention;

FIG. 2 schematically depicts a flow chart of an embodiment of a method in accordance with the present invention; and FIG. 3 schematically depicts a flow chart of another embodiment of a method in accordance with the present invention.

DETAILED DESCRIPTION OF THE DRAWINGS

It should be understood that the Figures are merely schematic and are not drawn to scale. It should also be understood that the same reference numerals are used throughout the Figures to indicate the same or similar parts.

FIG. 1 depicts a network 100 including a group 120 of network devices 110, which are arranged to communicate via a service provider 140. Such groups may for instance have been defined within the instant communication solution (ICS) framework using XCAP and SIP protocol messages. It will be understood that group definition mechanisms are known per se and outside the scope of the present application.

In an embodiment, the service provider 140 is comprised in a network host or server. The network 100 may be a wireless network, e.g. a 3G or UMTS mobile communication network, or a wired network. In an embodiment, the network is arranged to deliver services to network users using the IP Multimedia Subsystem (IMS) framework. Such a network 100 is referred to in the present application as an IMS network.

The service provider 140 may comprise multiple server stages such as an application server 142 for providing the requested services and a user data server 144. The user data server 144 may be a XML Document Management Server (XDMS) in case the network 100 is an IMS network. Such a XDMS may for instance be used for storing a network-based address list such as an address list of the network devices 110 subscribed to the group 120, or any XML data. The IMS network 100 may for instance use the XCAP protocol for allowing a network device 110 to access the data stored in the XDMS.

Within the group 120, the network devices 110, e.g. mobile communication devices such as a multimedia cell phone, a wireless personal computer or any other suitable network device 110, may be subscribed to different service packages; in FIG. 1, this is indicated by a single network device 110 being subscribed to service package 'A' and two network device 110 being subscribed to service package 'B'. It will be understood that the number of network devices 110 and the number of different service packages is chosen by way of non-limiting example only; any number of network devices 100 may be included in a group 120, with any number of different service or subscription packages being present within the group 120.

Any network device 110 may be configured to request a service from the service provider 140 by sending a service request 130 to the service provider 140. Such a request may take the form of a session initiation request, in which the service request may be embedded. In an embodiment, the network 100 is an IMS network, with the service request 130 being embedded in a session initiation protocol (SIP) or a session description protocol (SDP) compliant with the IMS standard. This will be explained in more detail later.

In accordance with an embodiment of the present invention, the service request 130 may comprise a request to provide a service to a network device 110 that is not subscribed to the requested service. The unsubscribed network device 110 may be the device sending the service request or may be another unsubscribed network device 110 in the group 120. The service request 130 may be a request for a service to be provided to a single network device 110 of the group, which may be the requesting device. Alternatively, the service request 130 may be for a service which involves several or even all of the network devices 110 in the group 120.

The service provider 140 is arranged to send a query 135 to the other network devices 110 of the group 120 to determine if the users of these devices are willing to at least temporarily share a subscription to the requested service with the unsubscribed network device 110 specified in the service request 130. The query 135 may be broadcasted to all other network devices 110 in the group 120 or to only those network devices 110 that are subscribed to the requested service. The service provider 140 may be arranged to determine which network devices 110 are subscribed to the requested service by checking the respective service plans associated with the network devices 110 in the group 120.

The network devices 110 are typically arranged to respond to the query 135 either automatically or by means of user intervention. The user of the network device 110 may decide if he or she wants to share the requested service with an unsubscribed user and may respond to the query 135 accordingly. The response may be preprogrammed in the network device 110 to facilitate automatic responding to the query 135 by the network device 110 receiving this query. This may for instance depend whether or not the sharing of the entitlement to the service is associated with an additional cost for the subscribed user. For instance, in case of a prepaid service, accepting the sharing of the service may result in a transfer of credits associated with a network device 110 that is subscribed to the service to a network device 110 for which (temporary) access to the service is requested. This may influence the decision made by the user of the subscribed network device 110.

In an embodiment, more than one user of a subscribed network device 110 may decide to share their entitlement to a requested service with one or more unsubscribed network devices 110 in the group 120. In such a scenario, any associated transfer of credits from the subscribed devices to the unsubscribed devices may be shared by the subscribed network devices 110. The credit information may be stored on the network devices 110 or on the service provider 140.

In another embodiment, the users of subscribed network devices 110 may specify how many credits they are willing to transfer to a network device 110 that is not subscribed to a requested service. In such a scenario, access to the service is only granted to the unsubscribed device if the sum of all specified credits is sufficient to provide the unsubscribed network device 110 with the requested service or to upgrade the service plan of the unsubscribed network device 110 to a level including the requested service.

It is pointed out that in the context of the present application, sharing a service does not necessarily mean that two or more network devices 110 simultaneously use the service. It merely means that an entitlement to a service is shared by more than one network device 110, although it does not exclude that multiple network devices 110 simultaneously are provided with the same service, as has been explained previously.

In case the service provider 140 receives at least one positive response to the query 135, the service provider 140 may provide the unsubscribed network device 110 with access to the requested service. Such access may be provided temporarily, e.g. for a duration specified in the service request 130, or indefinitely. In case of a specified duration, this specification may be provided indirectly, e.g. by the indication of service cost in the service request 130, which may be associated with a service duration by a price per unit time for the requested service.

In an embodiment, an unsubscribed network device 110 is only allowed access to the requested service when all subscribed network devices 110 respond positively to the query 135.

In yet another embodiment, the service provider 140 is arranged to formulate a service sharing proposal based on the service request 130 received from one of the network devices 110. For instance, the service provider 140 may be arranged to deduct which network devices 110 are not subscribed to the requested service and may send a further query to such unsubscribed devices to determine if the users of the unsubscribed network devices 110 want to agree to sharing the requested service under the terms specified in the service request 130, e.g. in terms of duration and cost.

The service request 130 may be provided to the service provider 140 in the form of a SIP message comprising several headers relating to the service request. A non-limiting example of such a SIP message is given below in Backus-Naur form (BNF) notation.

Message::=SIP Message SIP ProposalHeader Sdp

SIP ProposalHeader::=proposaltype unsubUsers planId amount duration proposaltype::=originator|recipient//indicates if the originator or the recipient of the proposal require service upgradation unsubUsers::=SIP Url+//sip url list of unsubscribed users to the service, DEFAULT: null planId::=plan+//indicates the plan to which the user wants to upgrade, DEFAULT: null amount::={digit}*decimal-point {digit}*//amount required to subscribe, DEFAULT:0; set to 0 if proposal is rejected else set to user specified value duration::={digit}*decimal-point {digit}*//duration to subscribe to new service, DEFAULT:0; set to 0 if proposal is rejected else set to user specified value.

In the above example, the SIP message comprises a SIP proposal header that includes multiple variables. For instance, in case of a subscribed user requesting an upgrade for an unsubscribed user of the group, the header may take the following values: {recipient; user2; silver; 50.0; 10.0}, which indicates that the sender of this SIP Message requests a service upgrade to a silver service plan for a recipient of the service request, which is user 2, and that the originator of the request is offering to offer 50 credits towards an service upgrade duration of 10 time units for user 2. It will be appreciated that the above variables are shown by way of non-limiting example and that at least some of the variables may be omitted from the header; for instance, the unsubUsers variable may be omitted when the service provider 140 maintains a service plan record for the users in the group.

In an alternative embodiment, the service request 130 may be provided to the service provider 140 in the form of a SDP message. A non-limiting example of such a SDP message is given in BNF notation below:

Message::=SIP Message Sdp ProposalSdp

ProposalSdp::=proposaltype unsubUsers planId amount duration proposaltype::=originator|requester//indicates if the originator or the recipient of the proposal require service upgradation unsubUsers::=SIP Url+//sip url list of unsubscribed users to the service, DEFAULT: null planId::=plan+//indicates the plan to which the user wants to upgrade, DEFAULT: null amount::={digit}*decimal-point {digit}*//amount required to subscribe, DEFAULT:0; set to 0 if proposal is rejected else set to user specified value duration::={digit}*decimal-point {digit}*//duration to subscribe to new service, DEFAULT:0 set to 0 if proposal is rejected else set to user specified value.

It is reiterated that one or more of the variables in the SIP and SDP messages may be omitted and other parameters relevant to establishing access to a requested service may be included. It will also be appreciated that other session initiation protocols may be used in alternative embodiments of the present invention. The responses to the query 135 by the network devices 110 as well as the query 135 itself may also be formulated using such headers.

In an embodiment, all requests communicated between the service provider 140 and the various users of the group involved in the service request are effected using one of the above discussed message formats. In this embodiment, if a user does not want or cannot specify one of the variables, this variable is set to its default value in the message generated by this user. A variable set to its default value may also be used as an indication of a refusal of a request; for instance, an amount value set to zero can be used by a user to signal the service provider 140 that the request to temporarily upgrade an unsubscribed user is rejected.

FIG. 2 depicts an embodiment of a flow of a service negotiation protocol between the network devices 110 of the group 120 and the service provider 140. In FIG. 2, user 2 and 3 are subscribed to a service included in their service plan 'B', whereas user 1 is not subscribed to this service, which is not included in service plan 'A'. The service negotiation is initiated by a service request 201 sent by user 1, which invites the members of the group 120 to take part in the requested service. In an embodiment, the service request is defined in a SIP message header or a SDP message header as discussed above. In case of a SIP message, the proposal type header will be set to 'originator', the duration header will be set to the duration user 1 wants to subscribe to the service and the plan Id header will be set to the plan to which the user 1 wants to upgrade.

Upon receiving the service request, the service provider 140 will analyze the subscription profiles of the members of the group 120, and will determine from these profiles that user 1 is not subscribed to the service. Alternatively, the service provider 140 may derive from the fact that the value of the plan Id header in message 201 is not set to its default value (Null) that user 1 is not subscribed to the requested service.

In an embodiment, the service provider 140 is arranged to maintain a list of group members, such that the service provider 140 can check this list to determine who is a member of the group.

The service provider 140 subsequently sends a query 202 to the group 120 indicating the proposal to allow identified unsubscribed network devices 110 access to the service. In an embodiment, the service provider 140 will send a service request containing a SIP INVITE message to the group indicating the proposal with the header 'amount' set to the amount required for user 1 to upgrade user 1 to the package including the requested service, and with the 'duration' header set to the requested duration of the subscription. This query may further comprise a list of all users in the group that need upgrading, which may be comprised in the unsubUsers header as previously discussed.

In the example of FIG. 2, this means that user 2 and user 3 will receive a proposal to share their entitlement to the requested service with unsubscribed user 1. Following the sending of the query 202, the service provider 140 may send user 1 a response 203 to inform user 1 that the service provider 140 is waiting for a response to the query 202 from the other group members.

The subscribed group members, i.e. user 2 and user 3 in this example, can either accept or reject the proposal, e.g. in the format as specified in BNF in the above headers. Assuming that the group members accept the proposal, the users 2 and 3 may send a positive response 204 in which the amount they wish to contribute towards the plan upgrade of user 1 has been specified. In an embodiment, the specification of a zero amount is interpreted as a rejection of the proposal and the specification of a non-zero amount is interpreted as an acceptance of the proposal.

In response to the positive response 204, the service provider will send an acknowledgement message 205 to the contributing group members to acknowledge their contribution. In case the sum of amounts contributed by the subscribed users is sufficient to upgrade user 1 to the requested service plan, the service provider 140 will send a notification message 206 to the contributing users informing them which amount has been deducted from their account and credited to user 1.

In an embodiment, the subscribed users, i.e. users 2 and 3 in this example, respond to the notification message 206 by sending a confirmation message 207 to the service provider 140, after which the service provider 140 sends a notification message 208 to user 1 to inform user 1 about the temporary upgrade to the requested service plan. This may be followed by an acknowledgement message 209 from the user 1 to the service provider 140.

It is reiterated that the amount contributed by user 2 and/or user 3 may be determined by the service provider 140 or by the users themselves. In case of the service provider 140 determining this amount, the service provider may determine this amount based on the specified amount in the service request 130. The amount taken from a single user may be capped, e.g. such that the subscribed user retains sufficient credits to access the service himself.

FIG. 3 depicts another embodiment of a flow of a service negotiation protocol between the network devices 110 of the group 120 and the service provider 140. In FIG. 3, user 1 and 3 are subscribed to a service included in their service plan 'B', whereas user 2 is not subscribed to this service, because it is not included in service plan 'A'. The service negotiation is initiated by a service request sent by user 1, which invites the members of the group 120 to take part in the requested service. In an embodiment, the service request is defined in a SIP header message or a SDP header message as discussed above.

In a first step, the user 1 sends a service request 301 to the service provider 140. The service request may be a SIP invitation message with the aforementioned additional headers set to their default values, due to the fact that user 1 is already subscribed to the requested service.

Upon reception of the service request 301, the service provider 140 will determine which users of the group are not subscribed to the requested service, i.e. user 2 in the given example, and will modify the received service request 301 by setting the additional headers such as the amount header, the duration header and the service plan header to the appropriate values for the unsubscribed users, after which the service provider 140 sends the modified service request 302 to the unsubscribed users.

Each unsubscribed user, i.e. user 2 in the given example, may decide whether or not to accept the upgrade proposal in order to participate in the requested service. In case of the unsubscribed user accepting the proposal, the unsubscribed user may send an acceptance message 303 to the service provider 140, which subsequently sends a notification message 304 to the user requesting the service indicating that the unsubscribed user has accepted the proposal. This notification message 304 may include the necessary message headers such as unsubUser and amount set to user 2 and the amount required to (temporarily) upgrade user 2 to the required service plan. The other subscribed users in the group, i.e. user 3 in the given example, will now receive a further modified service request 305, which may include the necessary message headers such as unsubUser and amount respectively set to 'user 2' and the amount required to (temporarily) upgrade user 2 to the required service plan. In an embodiment, the notification message 304 and a further modified service request 305 are sent simultaneously.

The subscribed group members can either accept or reject the proposal to upgrade the unsubscribed user(s) to the required service plan. In the given example, if User1 and User3 accept this proposal, these users will send a confirmation message 306. Each message 306 may include an amount header indicating the amount the subscribed user is willing to contribute, as previously discussed in the context of FIG. 2. A further confirmation message 307 may be sent by the service provider to the service requesting user, i.e. user 1 in the given example in case the sum of the offered amounts is sufficient to (temporarily) upgrade the unsubscribed user(s), which may be confirmed by the requesting user by sending an acknowledgement message 308 back to the service provider 140, after which the service provider 140 acknowledges the positive responses 303 and 305 of the other group users to the service request 301 by sending further acknowledgement messages 309 to the other group users.

The service provider 140 will subsequently check if the amounts made available by the users subscribed to the requested service are sufficient to (temporarily) upgrade all unsubscribed users to a service plan including the requested service. If this is the case, the service provider will send a notification message 310 to the unsubscribed users informing them of the service upgrade, and a notification message 311 to the subscribed users informing them about the amount deducted from their account to facilitate the service upgrade of the unsubscribed users. It is reiterated that this amount may be different, i.e. less, than the amount made available by the subscribed users in case the sum of these amounts exceeded the amount required for the upgrade.

In an embodiment, the various users acknowledge the notification messages 310 and 311 by respective acknowledgement messages 312 and 313. These acknowledgement messages may be used as an additional acceptance mechanism for the users, such that the service is only provided after these acknowledgement messages have been received. In an alternative embodiment, the requested service is provided without the need for receiving these acknowledgement messages 312 and 313.

It will be immediately apparent to the skilled person that the communication protocols shown in FIG. 2 and FIG. 3 are non-limiting examples of such protocols, and that these protocols may be altered, e.g. by addition or omission of some of the messages, or by alteration of the message sequences, without departing from the scope of the invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of providing a service to a network device from a group of network devices, some but not all of the network devices being subscribed to said service, the method comprising:
    determining which network devices of the group are not subscribed to said service in response to a service request from one of the network devices of said group;
    querying at least the network devices of the group that are subscribed to said service for permission to at least temporarily share the service with an unsubscribed network device based on one or more of the subscribed network devices being allocated a cost for temporarily sharing the service with said unsubscribed network device; and
    at least temporarily providing the service to at least some of the unsubscribed network devices in response to a positive response to said query from at least one of the subscribed network devices assenting to bear at least a portion of the cost of temporarily sharing the service with said unsubscribed network device.

2. The method of claim 1, wherein the service request is comprised in a session initiation request.

3. The method of claim 2, wherein the service request is comprised in at least one of a session initiation protocol and a session description protocol.

4. The method of claim 1, wherein the service request comprises an indication of a transferable amount of credit from a subscribed network device to at least temporarily provide the unsubscribed network device with the requested service.

5. The method of claim 4, further comprising transferring credit based on said transferable amount indication from a subscribed network device to an unsubscribed network device in response to a positive response of the subscribed network device to said query.

6. The method of claim 5, wherein the amount of transferred credit is user-defined.

7. The method of claim 5 or 6, wherein the service is provided to the unsubscribed network device if a sum of transferable amounts approved by all subscribed network devices positively responding to said query at least equals an upgrade amount required to at least temporarily provide the unsubscribed network device with the requested service.

8. The method of claim 7, wherein the step of transferring credit comprises transferring credit from each subscribed network device that responds positively to said query to the unsubscribed network device, wherein the sum of the respectively transferred credits equals the upgrade amount.

9. The method of claim 1, wherein the service request comprises a subscription identification allowing a determination of whether the device requesting the service is subscribed to said service.

10. The method of claim 1, wherein the service request is a request for a service requiring participation of all the network devices of the group, wherein the step of at least temporarily providing the service to at least some of the unsubscribed network devices is performed in response to a positive response to said query from all of the subscribed network devices.

11. The method of claim 1, further comprising:
    further querying an unsubscribed network device in response to the service request to determine if the unsubscribed network device requests to share the requested service, wherein the step of querying the at least the network devices of the group that are subscribed to said service for permission to at least temporarily share the service with an unsubscribed network device is executed in response to a positive response to the further query.

12. The method of claim 1, wherein the service is provided in an IP multimedia subsystem network.

13. The method of claim 1, wherein at least one of the subscribed network devices in the group is programmed to automatically respond to the query for permission to at least temporarily share the service with an unsubscribed network device.

14. The method of claim 13, wherein that subscribed network devices in the group is programmed to automatically respond to the query for permission to at least temporarily share the service with an unsubscribed network device based on whether sharing the service is associated with an additional cost to that subscribed network device.

15. A method of providing a service to a network device from a group of network devices, some but not all of the network devices being subscribed to said service, the method comprising:
  determining which network devices of the group are not subscribed to said service in response to a service request from one of the network devices of said group;
  querying at least the network devices of the group that are subscribed to said service for permission to at least temporarily share the service with an unsubscribed network device; and
  at least temporarily providing the service to at least some of the unsubscribed network devices in response to a positive response to said query from at least one of the subscribed network devices;
  wherein the service request comprises a service duration request.

16. A network server for providing a service to a group of network devices, some but not all of the network devices being subscribed to said service, the network server being arranged to:
  determine which network devices of the group are not subscribed to said service in response to a service request from one of the network devices of said group;
  query the network devices of the group that are subscribed to said service for permission to at least temporarily share the service with an unsubscribed network device; and
  at least temporarily provide the service to at least some of the unsubscribed network devices in response to a positive response to said query from all of the subscribed network devices.

17. The network server of claim 16, wherein the service request comprises an indication of a transferable amount of credit from a subscribed network device to at least temporarily provide the unsubscribed network device with the requested service, the network server further being arranged to transfer credit based on said indication from a subscribed network device to an unsubscribed network device in response to a positive response of the subscribed network device to said query.

18. The network server of claim 17, wherein the network server is arranged to transfer credit from each subscribed network device that responds positively to said query to the at least one unsubscribed network device, wherein a sum of the respectively transferred credits equals an upgrade amount required to at least temporarily provide the unsubscribed network device with the requested service.

* * * * *

UNITED STATES PATENT AND TRADEMARK OFFICE
CERTIFICATE OF CORRECTION

PATENT NO. : 8,640,199 B2  
APPLICATION NO. : 12/333337  
DATED : January 28, 2014  
INVENTOR(S) : Rahul et al.

Page 1 of 1

It is certified that error appears in the above-identified patent and that said Letters Patent is hereby corrected as shown below:

On the title page, item (73), Assignee, in column 1, lines 1-2, delete "Developmet Company." and insert --Development Company, L.P., --, therefor.

Signed and Sealed this
Fourteenth Day of October, 2014

Michelle K. Lee
*Deputy Director of the United States Patent and Trademark Office*